April 11, 1939.  E. F. HUBACKER  2,153,563
ELECTRIC MOTOR AND METHOD OF MAKING THE SAME
Filed Jan. 8, 1937  2 Sheets—Sheet 1
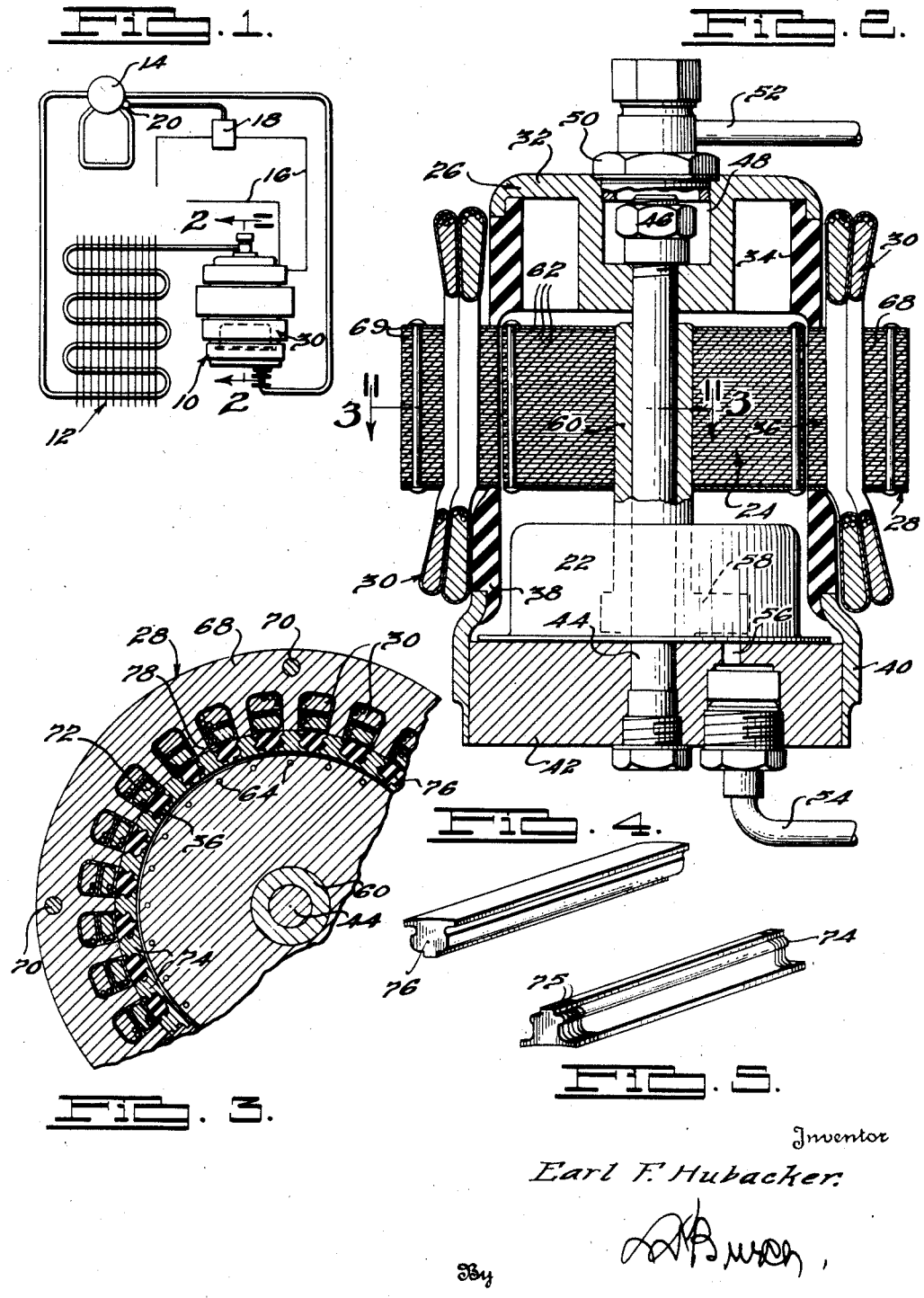
Inventor
Earl F. Hubacker.
By [signature]
Attorney April 11, 1939.  E. F. HUBACKER  2,153,563

ELECTRIC MOTOR AND METHOD OF MAKING THE SAME

Filed Jan. 8, 1937  2 Sheets-Sheet 2

Inventor
Earl F. Hubacker
By
Attorney

Patented Apr. 11, 1939

2,153,563

UNITED STATES PATENT OFFICE 2,153,563

ELECTRIC MOTOR AND METHOD OF MAKING THE SAME

Earl F. Hubacker, Highland Park, Mich., assignor to Borg-Warner Corporation, a corporation of Illinois Application January 8, 1937, Serial No. 119,568

21 Claims. (Cl. 172—36)

This invention relates to electric motors and method of making the same and has particular reference to electric motors for use in refrigerating systems of the "sealed unit" type.

My invention contemplates an electric motor construction wherein the rotor thereof is arranged within a gas-tight casing, which also encloses a compressor element of the refrigerating system, with the motor windings arranged externally of said casing.

This invention has particular reference to improvements in electric motors of the foregoing type wherein by virtue of certain novel features, the flux losses and attendant inefficiency of motors of this type as heretofore constructed have been eliminated so that electric motors embodying the novel features hereinafter disclosed and of the foregoing type may be constructed to operate just as efficiently as motors of the type now commonly employed for operating compressor elements of refrigerating systems.

A principal object of the invention is the provision of a new and improved type of sealed motor compressor construction, particularly adapted for use in refrigerating systems.

Another object of the invention is the provision of a new and improved form of a sealed motor compressor unit wherein the motor windings are arranged externally of a gas-tight casing which encloses the motor rotor and a compressor element, and which sealed motor compressor unit is cheaper in construction and more efficient in operation than units of the foregoing type heretofore known.

Another object of the invention is the provision of a sealed motor compressor unit wherein the compressor and the rotor of the motor are arranged within a gas-tight casing, with the motor windings arranged externally of such casing, and which casing is constructed in part of a non-conducting material, such as a moldable plastic.

Another object of the invention is to provide a method of constructing and assembling sealed motor units of the foregoing type so that such units may be manufactured on a large scale production basis and at a cost comparable to that of building other types of motors now commonly employed in refrigerating systems.

Other objects and advantages of the invention will be apparent from a consideration of the following specification taken in conjunction with the accompanying drawings of which there are two (2) sheets, and wherein:

Fig. 1 is a diagrammatic view illustrating the application of a sealed motor unit embodying my invention to a refrigerating system of the compressor-condenser-expander type;

Fig. 2 is a vertical sectional view of the motor compressor unit illustrated in Fig. 1 and taken generally along the line 2—2 thereof;

Fig. 3 is a horizontal sectional view taken in a plane along the line 3—3 of Fig. 2, looking in the direction of the arrows;

Fig. 4 is a perspective view of a non-conducting or plastic insert and which forms a part of the gas-tight casing of the sealed motor compressor unit;

Fig. 5 is a perspective view of a stack of laminations which forms a part of the gas-tight casing of the sealed motor unit;

Fig. 6 is a view similar to that of Fig. 2, but illustrating a modified form of construction;

Figure 7:
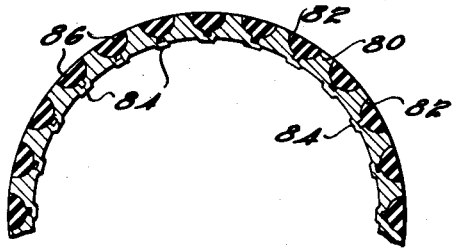
Fig. 7 is a view similar to that of Fig. 3 and illustrating a modified form of construction of the gas-tight casing, this figure illustrating the appearance of a part of the casing at an intermediate state of the manufacture thereof.

In Fig. 1 there is illustrated the application of a sealed motor compressor unit embodying my invention to a refrigerating system; such system being illustrated as comprising a sealed motor compressor unit 10, a condenser 12 and an evaporator 14 adapted for disposal in a heat insulated compartment, and all of the elements of the system being connected in a closed cycle and the system being charged with a suitable refrigerant. Preferably the circuit 16 for the motor of the unit 10 includes a thermally operated switch 18 which has a thermostatic element 20 thermally associated with the evaporator element 14 so that the compressor element of the unit 10 may be operated intermittently for supplying refrigerant to the evaporator element 14 in order to maintain the temperature thereof within certain predetermined limits, the supply of refrigerant to the evaporator being under the control of a suitable regulating device, such as a float valve.

The sealed motor compressor unit 10 comprises a compressor 22 shown in elevation and which compressor may be of the rotary type, and a rotor 24 arranged within a gas-tight casing 26, and a stator 28 including the motor windings 30, which are arranged externally of the casing 26. The casing 26, as illustrated in Fig. 2 comprises a metallic end plate 32, an intermediate non-metallic ring 34, a stator ring indicated generally at 36, a second non-metallic ring 38, and a metallic end ring 40, all of which parts are integrally connected so as to form a gas-tight shell, and a metallic end wall or bearing block 42 is fitted within the metallic end ring 40 and sealed thereto such as by welding so as to provide a closed gas-tight casing or shell. The non-metallic rings 34 and 38 are illustrated as being formed of a moldable plastic or non-conducting material and may be bonded or otherwise suitably secured to the stator ring 36, the end plate 32 and the end ring 40. The bearing block 42 has rigidly secured thereto an upstanding axle or shaft 44, which extends axially through the casing 26 and the end of which shaft 44 projects through a central opening in the end plate 32 into a recess therein, wherein a nut 46 is threadedly secured to such end of the shaft 44 so as to assist in holding the parts of the casing 26 together. The recess 48 in which the nut 46 is disposed may be closed by a coupling member 50 to which a conduit 52 for the refrigerant medium is connected, it being contemplated that some provision be made for affording communication between the recess 48 and the interior of the casing 26. Refrigerant compressed in the compressor 22 may be discharged in any suitable manner into the interior of the casing 26 from whence it may escape through an opening (not shown) in the wall thereof into the recess 48. Another conduit 54 may be connected to a passageway 56 through the bearing block for supplying vaporous refrigerant to the compressor 22.

The shaft 44 comprises an axle upon which the rotor 24 of the motor and an eccentric 58 of the compressor 22 may rotate, the rotor 24 of the motor being illustrated as carried by a sleeve 60 journaled upon the shaft 44 and which may be formed integrally with the eccentric 58. A thrust bearing may be provided between the eccentric 58 and the bearing block 42 for taking the thrust of the rotor of the motor. The rotor 24 of the motor may comprise a stack of laminations 62 secured together by a series of rivets 64 and which stack of laminations are press-fitted upon one end of the sleeve 60. The rotor 24 may be provided with a series of passageways extending therethrough so as to permit the transfer of refrigerant from one side of the rotor to the other.

The stator 28 of the motor includes the inner ring 36, the outer ring 68, which rings are assembled so as to form an integral unit and the motor windings 30. The outer ring 68 may comprise a stack of laminations 69 secured together, such as by a series of rivets 70 and formed to provide on the inner periphery thereof a series of radially extending slots 72 adapted for receiving the motor windings 30. The inner ring 36 may comprise an annular series of stacks 74 of laminations 75 connected together by complementary-shaped non-metallic or non-conducting inserts 76 and which inserts are adapted to be arranged opposite, or radially in line with the motor windings 30. The non-conducting inserts 76 may be formed of a plastic material and bonded to the stacks 74 of laminations 75 so as to provide an integral gas-tight ring 36. The laminations 75 of the stacks 74 may be formed of silicon steel and are adapted to be arranged radially inwardly of the metal fingers 78 of the outer ring 68, which are disposed between the slots 72.

The laminations 75 for the stacks 74 of laminations may be formed separately and then arranged in stacks. The inserts 76 may be individually formed and together with the stacks 74 of laminations may be arranged in a mold where the stacks 74 of laminations and the inserts 76 may be subjected to pressure and/or heat so as to bond the laminations 75 of the stacks 74 and the inserts 76 together in order to provide a gas-tight ring. Preferably the laminations 75 of the stacks 74 are provided with plastic or sealing material between the faces thereof in order to insure the sealing of the laminations 75 of the stacks 74 together. After the inner ring 36 is formed the outer periphery thereof and/or the inner periphery of the outer ring may be ground so that the inner ring can be press-fitted within inner periphery of the outer ring 68. The inner ring 36 is to be so fitted to the outer ring 68 so that there is good contact between the stacks 74 of laminations and the inwardly extending fingers 78 of the laminations of the outer ring 68 in order that good conductivity may be provided for the magnetic field. After the inner ring 36 and the outer ring 68 have been assembled together so as to form a unit, the inner periphery of the inner ring 36 is ground so as to provide a surface which will be concentric with the axis about which the stator 24 rotates so that a proper air gap may be provided between the rotor 24 and the stator 28.

The motor windings 30 are arranged in the slots 72 before the inner ring 36 is assembled with the outer ring 68 and after assembly of the inner and outer rings of the stator 28 and the motor windings 30, the same, together with the non-metallic rings 34 and 38, the end plate 32 and the end ring 40, are suitably secured together so as to form the gas-tight shell 26.

As the rotor 24 and the stator rings 36 and 68 are made up of stacks of laminations of a suitable magnetic material such as silicon steel, a single blank of metal may be utilized to form lamina for each of these parts; that is, a single blank of metal may be stamped out to form a lamina 69 for the outer stator ring 68, a lamina 62 for the rotor 24 and an annular lamina out of which the laminations 75 of the stack 74 are formed. This annular lamina, which would be the metal left over after the rotor lamina 62 and the lamina 69 for the outer stator ring 68 were formed, could be utilized to form the laminations 75 of the stacks 74. This might be done by stamping out such annular lamina to define laminations 75, such as illustrated in Fig. 5, which would have to be stacked and arranged along with the inserts 76 so as to make up the ring 36, as previously described.

The annular lamina remaining after the lamina 62 of the rotor and the lamina 69 for the outer stator ring have been formed might be made in a form such as that illustrated at 80 in Fig. 7. It will be observed that the metal of the annular lamina 80 is continuous and that the lamina 80 is formed to provide slots 82 which are bridged at the inner periphery of the lamina 80 by a very small amount of metal indicated at 84. This connecting portion 84 may be in the neighborhood of .025" thick and be disposed inwardly with respect to the main body of the lamina 80. The slots 82 formed in the lamina 80 are adapted to receive inserts 86 of a non-conducting material such as a plastic and these inserts may be formed individually.

Figure 8:
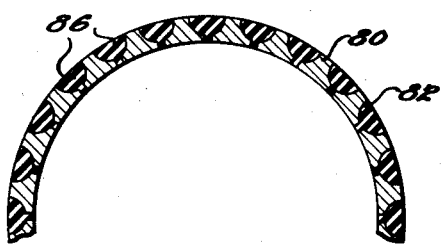
Fig. 8 is a view similar to that illustrated in Fig. 7 but showing the appearance of a part of the gas-tight casing at a later step in the manufacture thereof.
Figure 9:
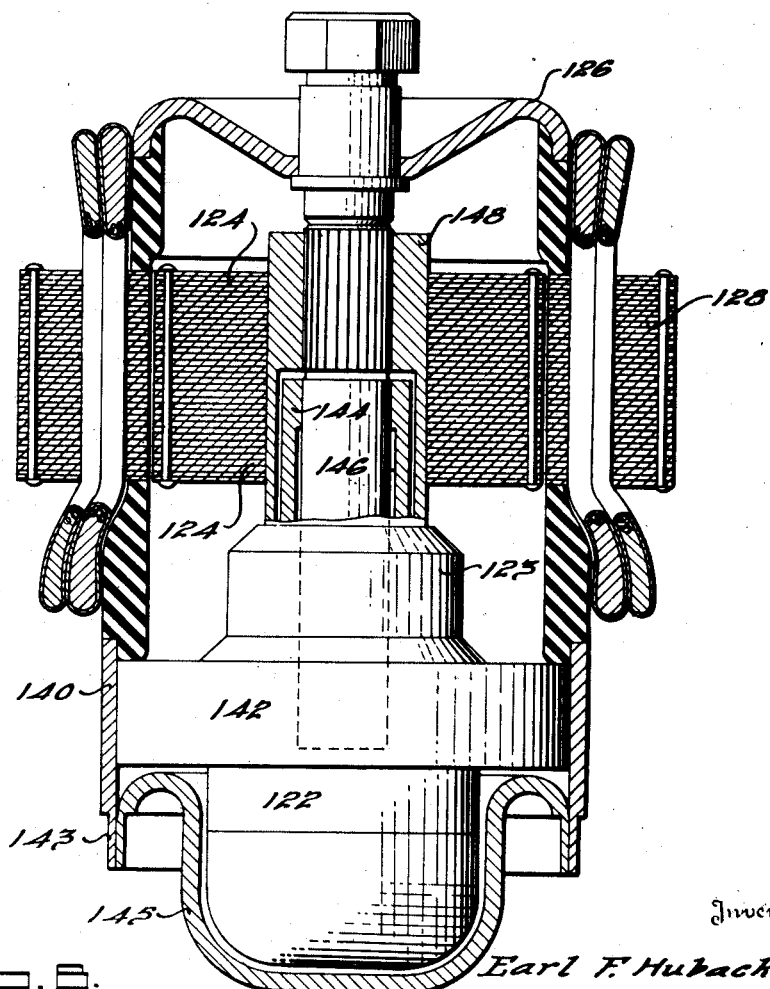

A stator ring such as 36 and made up of a stack of laminations such as those indicated at 80 may have the inserts 86 placed therein when a stack of laminations 80 are assembled in a mold or the inserts 86 may be formed by introducing a plastic material under heat and pressure into a mold in which a stack of laminations 80 are assembled. It is contemplated that the laminations 80 may be coated with a plastic or sealing material so that when the laminations 80 are assembled in a mold and the inserts 86 are formed and disposed in the slots 82, the entire stator ring including the laminations 82 and the inserts 86 would be bonded together so as to form a gas-tight ring. After the ring made up of the laminations 80 has been formed, the inner periphery thereof may be ground out to provide a ring such as that illustrated in Fig. 8. Referring to Fig. 8, it will be observed, that the connecting portions 84 have been ground away so that the stator ring comprises stacks of laminations alternately arranged with bars or inserts of plastic or non-conducting material and all of which are intimately bonded together. The configuration of the lamina 75 and inserts 76 is believed to produce a better joint between the metal and the non-metallic material forming the inner stator ring.

Instead of forming the connecting portions 84 as illustrated in Fig. 7, the lamina 80 might be formed so that the inner periphery thereof was cylindrical and so that the slots 82 were of such a depth as to leave only a very small amount of metal bridging the slots; then, after the plastic material had been bonded to the stack of laminations to form an inner stator ring, the entire inner periphery of such ring might be ground down to such an extent as to grind away the metal or connecting portion bridging the slots 82 or such metal or connecting portion bridging the slots might be cut, such as by a saw, so that the continuity of the metal was interrupted and so that the inserts 82 would be alternately arranged with the metal to form a continuous gas-tight ring. This annular ring could then be assembled with the outer stator ring in the manner as described in connection with the stator ring 36.

In Fig. 6 there is illustrated a modified form of construction wherein a casing or shell 126 is formed similar to the shell 26 except for the open end thereof. A bearing block 142 is arranged within a metallic end ring 140 which forms the end of the shell 126 and the ring 140 projects beyond the end of the bearing block 142 so as to form an annular surface 143 to which a stamped end plate 145 may be secured, such as by welding. The bearing block 142 is provided with a sleeve-like bearing member 144 in which a shaft 146 is journaled. One end of the shaft 146 is secured to a sleeve 148 and the other end of the shaft 146 is extended to form an eccentric for the compressor 122 which may be of the rotary type. The sleeve 148 carries the rotor 124 and extends down below the top of a shell 123 which is adapted for collecting oil therein and about the working parts of the rotary compressor.

In the case of the modification illustrated in Fig. 6 the stator 128 may correspond in construction to that of the stator 28 illustrated in Fig. 2. The principal difference between the two modifications is that in the case of modification illustrated in Fig. 6 the shaft 146 is supported by the single bearing 144, which is mounted upon the bearing block 142 and such bearing is not directly connected with the top plate of the casing 126, whereas in the modification illustrated in Fig. 2 the shaft 44 is connected to the top and bottom walls of the casing and hence is dependent upon the position of both of these members in order to maintain and establish its proper position. That is, in the case of the modification illustrated in Fig. 2 the alignment of the rotor 24 with the stator 28 is dependent upon the proper alignment of the shaft 44 which has two points of support, whereas the bearing 144 in the modification illustrated in Fig. 6 has only one point of support.

It will be observed that in both of the forms of inner stator rings as illustrated in Figs. 3 and 8, the stator rings are made up of stacks of laminations separated by inserts of non-conducting or plastic material securely bonded thereto. It will also be observed that those parts of the casings 26 and 126 opposite the motor windings are formed of a non-conducting material such as plastic material in order to prevent any magnetic losses through these parts of the casing.

The plastic or non-conducting material should be resistant to oil and the refrigerant medium and also one which is capable of withstanding the temperatures and pressures which prevail within the casings 26 and 126 in order to prevent the leakage of refrigerant. Those portions of the walls of the casing 26 and 126 formed of plastic material preferably should be bonded to the metallic parts of the casing. Examples of plastic material which may be used are glass, phenolic molding compounds and inorganic cold molded compounds.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. Electric motor construction comprising an annulus of laminations of magnetic material forming an outer stator ring, an inner stator ring arranged within said outer stator ring, said rings being formed to provide an annular series of slots therebetween, said inner stator ring being formed of non-conducting material and laminations of magnetic material bonded together so as to form a gas-tight ring, said inner ring constituting a part of a gas-tight casing, a motor rotor arranged within said casing, and motor windings arranged in said slots and disposed externally of said casing.

2. Electric motor construction comprising an annulus of laminations of magnetic material forming an outer stator ring, an inner stator ring arranged within said outer stator ring, said rings being formed to provide an annular series of slots therebetween, said inner stator ring being formed of plastic material and laminations of magnetic material bonded together so as to form a gas-tight ring, said inner ring constituting a part of a sealed casing, a motor rotor arranged within said casing, and motor windings arranged in said slots and disposed externally of said casing.

3. In electric motor construction, a stator comprising an annulus of laminations of magnetic material provided with inwardly extending laminated projections arranged to define an annular series of slots, motor windings arranged in said slots, the inner extremities of said projections constituting a part of a gas-tight ring arranged inwardly of said motor windings and said ring being formed in part of a non-conducting material bonded to the inner extremities of said projections, said gas-tight ring constituting a part of a sealed casing, and a motor rotor arranged within said casing.

4. In electric motor construction, a stator comprising an annulus of laminations of magnetic material and having inwardly extending laminated sections of magnetic material arranged to define an annular series of slots, motor windings arranged in said slots, the inner portion of said sections comprising a part of a gas-tight ring which is formed in part of a plastic material bonded to said laminations, said gas-tight ring forming a part of a sealed casing which is arranged inwardly of said motor windings and a motor rotor arranged within said gas-tight casing.

5. In electric motor construction, a stator comprising an annulus of laminations of magnetic material and having inwardly extending laminated sections of magnetic material arranged to define an annular series of slots, motor windings arranged in said slots, the inner portion of said sections comprising a part of a gas-tight ring which is formed in part of a plastic material bonded to said laminations, said gas-tight ring forming a part of a sealed casing which is arranged inwardly of said motor windings and a motor rotor arranged within said gas-tight casing, those portions of said gas-tight casing disposed opposite to said motor windings being formed of plastic material.

6. In electric motor construction, a stator comprising an annulus of laminations of magnetic material provided with inwardly extending laminated projections arranged to define an annular series of slots, motor windings arranged in said slots, the inner extremities of said projections constituting a part of a gas-tight ring arranged inwardly of said motor windings and said ring being formed in part of a non-conducting material bonded to the inner extremities of said projections, said gas-tight ring constituting a part of a sealed casing, and a motor rotor arranged within said casing, those portions of said sealed casing opposite said motor windings being formed of a non-conducting material.

7. Electric motor construction comprising a gas-tight ring adapted to form a part of a gas-tight casing, said ring comprising an annular series of spaced stacks of laminations of magnetic material connected by bodies of non-conducting material, said ring forming a part of a sealed casing, a motor rotor arranged within said casing, an annulus of laminations disposed outwardly of said ring and adapted to provide in conjunction therewith an annular series of slots, and motor windings arranged in said slots and disposed externally of said casing.

8. In electric motor construction, a gas-tight ring comprising alternately arranged sections of laminations of magnetic material and of plastic material bonded together, said ring forming a part of a sealed casing, a motor rotor arranged within said casing, motor windings arranged externally of said ring, and means associated with said motor windings and with said laminations of said ring to provide a path for the magnetic field.

9. In electric motor construction, a gas-tight ring formed of non-conducting material and laminations of magnetic material bonded together, said ring forming a part of a gas-tight casing, a motor rotor arranged within said casing, motor windings arranged externally of said ring, and means operatively associated with said windings and the laminations of said ring, so as to provide a metallic path for the magnetic field.

10. In electric motor construction, a gas-tight ring formed of plastic material and laminations of magnetic material bonded together, said ring forming a part of a sealed casing, a motor rotor arranged within said casing, motor windings arranged externally of said ring, and means including laminations of magnetic material operatively associated with said windings and said laminations of said ring to provide a metallic path for the magnetic field of said windings.

11. In electric motor construction, a gas-tight ring comprising segments of laminations of magnetic material separated by and bonded to segments of a non-conducting material, said ring forming a part of a sealed casing, a motor rotor arranged within said casing, motor windings arranged externally of said ring, and means including laminations of magnetic material operatively associated with said motor windings and said laminations of said ring to provide a metallic path for the magnetic field of said windings.

12. In electric motor construction, a gas-tight ring comprising segments of laminations of magnetic material separated by and bonded to segments of a plastic material, said ring forming a part of a sealed casing, a motor rotor arranged within said casing, motor windings arranged externally of said ring, and means including laminations of magnetic material operatively associated with said motor windings and said laminations of said ring to provide a metallic path for the magnetic field of said windings.

13. The method of forming a stator ring for a sealed motor wherein the windings are arranged externally of a sealed casing which comprises forming a plurality of laminations of magnetic material, forming a stack of said laminations, bonding plastic material to said stack of laminations externally thereof, and removing metal from the inside of said stack so as to interrupt the continuity of the laminations on the inner periphery of said stack.

14. The method of forming a stator ring for a sealed motor wherein the windings are arranged externally of a sealed casing which consists in forming a series of annular laminations having radial projections defining slots therebetween, forming a stack of said laminations, bonding a non-conducting material in said slots, and grinding away the inner periphery of said stack so as to expose said non-conducting material to the inside of said stack.

15. The method of forming a stator ring for a sealed motor wherein the windings are arranged externally of a sealed casing which consists in forming a stack of laminations of magnetic material provided with external projections defining slots, bonding a plastic material to said stack and within said slots, and cutting and magnetic material away from said stack and on the inside thereof opposite said slots so as to interrupt the continuity of said laminations.

16. The method of forming a stator ring for a sealed motor wherein the windings are arranged externally of a sealed casing which consists in forming stacks of plastic material and of laminations of magnetic material, alternately arranging stacks of laminations and of plastic material so as to define a ring, and bonding said material together so as to provide a gas-tight ring.

17. The method of forming a stator ring for a sealed motor wherein the windings are arranged externally of a sealed casing which comprises forming a plurality of laminations of magnetic material, forming said laminations into a stack, bonding said stack of laminations together and removing metal from laminations on the inside of said stack.

18. Electric motor construction comprising a stack of laminations of magnetic material forming an outer stator ring, an inner stator ring arranged within said outer ring, said rings being formed to provide a series of motor winding slots therebetween, said inner ring being formed of plastic material and of laminations of magnetic material bonded together so as to form a gas-tight ring, said ring constituting a part of a sealed casing, a motor rotor operatively arranged within said casing and motor windings arranged in said slots and exposed to the air outside of said casing.

19. Electric motor construction comprising a stack of laminations of magnetic material forming an outer stator ring, an inner stator ring arranged within said outer ring, said rings being formed to provide a series of motor winding slots therebetween, said inner ring being formed of glass and of laminations of magnetic material bonded together so as to form a gas-tight ring, said ring constituting a part of a sealed casing, a motor rotor operatively arranged within said casing and motor windings arranged in said slots and exposed to the air outside of said casing.

20. Electric motor construction comprising a stack of laminations of magnetic material forming an outer stator ring, an inner stator ring arranged within said outer ring, said rings being formed to provide a series of motor winding slots therebetween, said inner ring being formed of nonconducting material and laminations of magnetic material bonded together, said inner ring constituting a part of a sealed casing which includes a pair of end sections, means for securing said inner ring and said end sections together, a motor rotor operatively arranged within said casing and motor windings arranged in said slots and disposed externally of said casing.

21. Electric motor construction comprising a stator ring formed of nonconducting material and laminations of magnetic material bonded together so as to form a gas-tight ring, motor windings arranged externally of said ring, said ring constituting a part of a sealed casing which includes sections of nonconducting material arranged opposite the ends of said motor windings, means for securing said sections and said ring together, a motor rotor operatively arranged within said casing and means operatively associated with said motor windings and with said laminations of said ring to provide a path for the magnetic field of said windings.

EARL F. HUBACKER.